April 13, 1937.   E. C. GAMBRELL   2,076,887
FLUID CLUTCH
Filed June 17, 1935   4 Sheets-Sheet 1
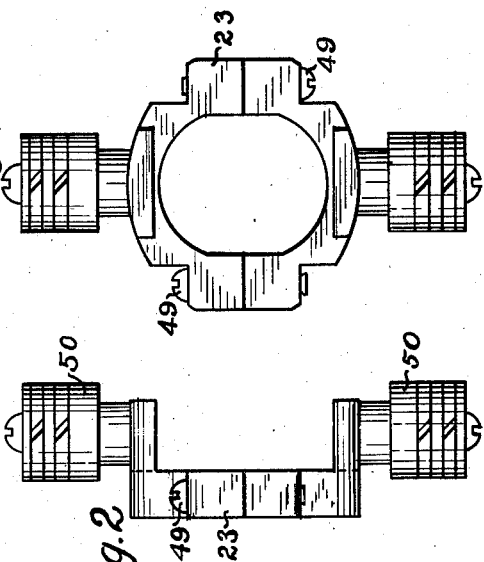
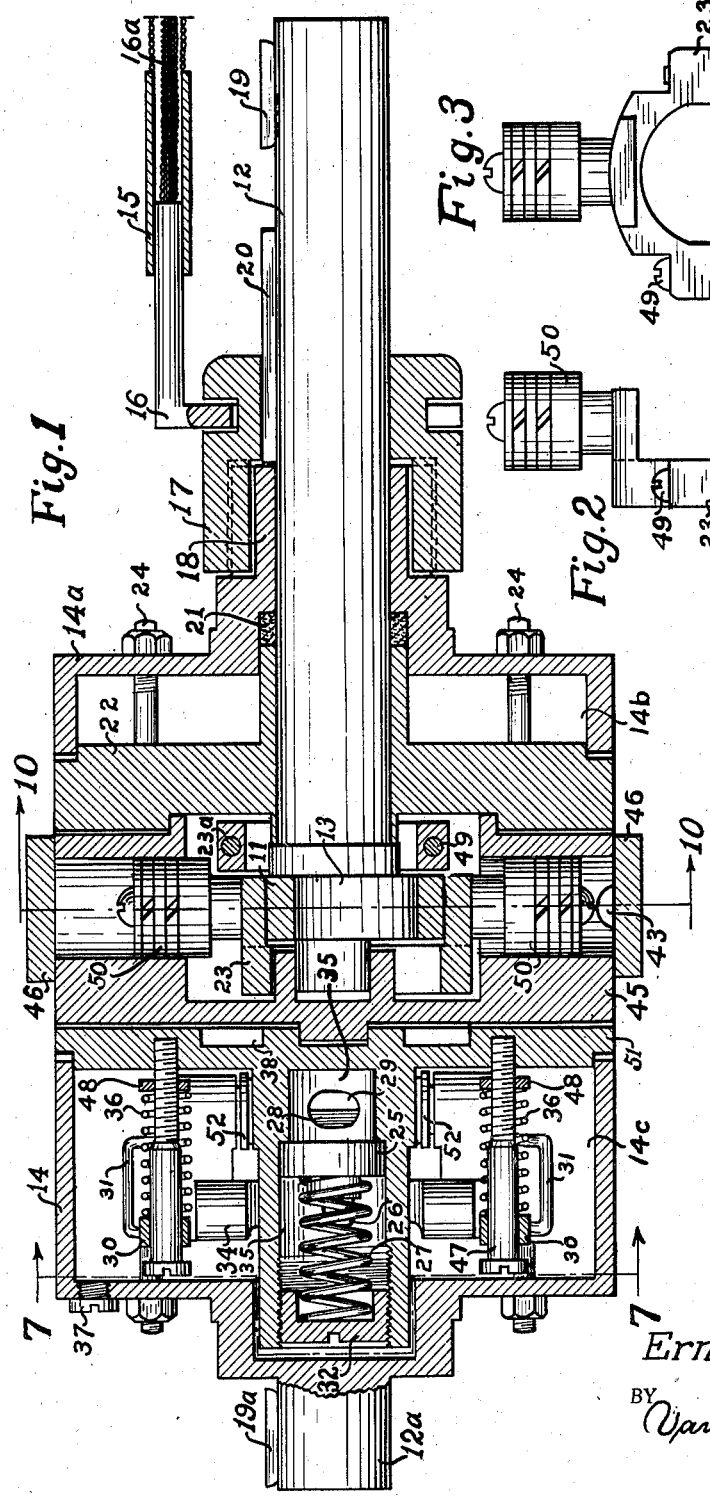
INVENTOR.
Ernest C. Gambrell
BY Van Buren Hillyard.
ATTORNEY.

April 13, 1937.  E. C. GAMBRELL  2,076,887
FLUID CLUTCH
Filed June 17, 1935    4 Sheets-Sheet 2
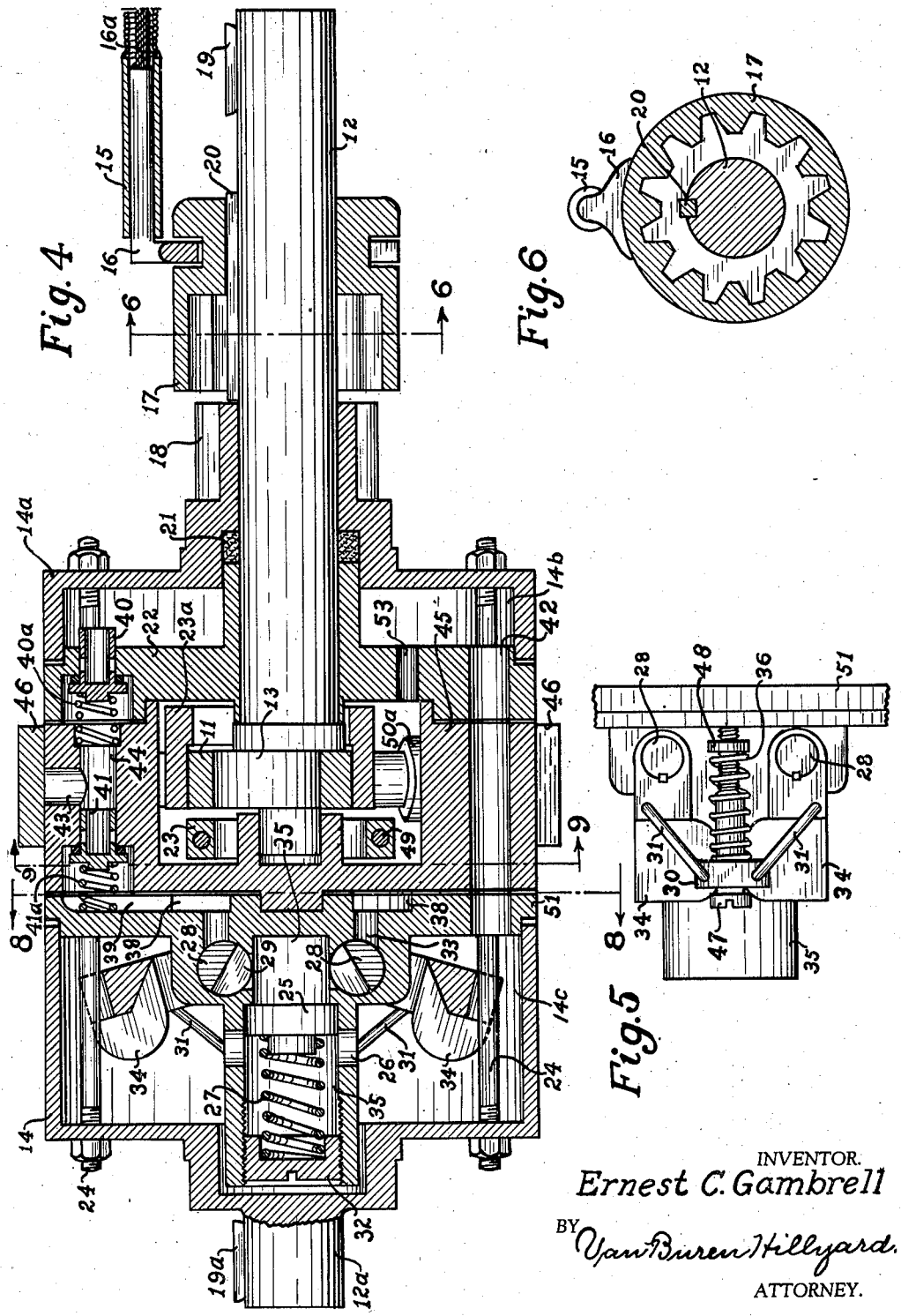
INVENTOR.
Ernest C. Gambrell
BY Van Buren Hillyard.
ATTORNEY.

April 13, 1937.  E. C. GAMBRELL  2,076,887

FLUID CLUTCH

Filed June 17, 1935  4 Sheets-Sheet 3

INVENTOR.
Ernest C. Gambrell
BY
Yaw Burn Hillyard.
ATTORNEY.

April 13, 1937.　　E. C. GAMBRELL　　2,076,887
FLUID CLUTCH
Filed June 17, 1935　　4 Sheets-Sheet 4

INVENTOR.
Ernest C. Gambrell
BY Van Buren Hilljard.
ATTORNEY.

Patented Apr. 13, 1937

2,076,887

UNITED STATES PATENT OFFICE 2,076,887

FLUID CLUTCH

Ernest C. Gambrell, Wichita Falls, Tex., assignor of one-fourth to Lutie L. Gambrell, Mineral Wells, Tex., independent executrix of the estate of W. E. Gambrell, deceased Application June 17, 1935, Serial No. 27,113

7 Claims. (Cl. 192—60)

The invention relates to power translating means and provides a unit for connecting a driving member to a driven member, whereby the ratio between the speed of the driving member and the speed of the driven member is automatically varied, affording a flexible or yielding transmission of power to the driven member.

The invention provides a unit especially adapted for motor driven vehicles and craft of every description and adapted to be interposed in the power transmitting line, in conjunction with a standard clutching mechanism such as a friction clutch. The operation of the standard friction clutch is only necessary in starting and stopping the vehicle.

The invention furthermore aims to obviate excessive racing of the motor in low gear, resulting in a saving of fuel, minimizing wear on the motor, and provide a quick pick-up or getaway, this being due to the automatic change of ratio which is gradual up to the speed of the driving member.

The invention also eliminates the accustomed manual operation of gear shift and clutch levers except when starting and stopping, since the car may be set in motion in high gear and the speed ratio is automatically varied to take care of the need for power. Moreover, strain on the motor is avoided because change of ratio between the drive member and driven member is automatically afforded to compensate for additional power.

While the drawings illustrate a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:

Figure 1 is a longitudinal sectional view of an embodiment and adaptation of the invention, on the line 1—1 of Figure 10, the drive and driven members being in clutched engagement.

Figure 2 is a side view of a pair of connected pistons.

Figure 3 is a front view of the parts shown in Figure 2.

Figure 4 is a view similar to Figure 1 on the line 4—4 of Figure 10, the clutch connecting the drive and driven members being disconnected.

Figure 5 is a detail view of the governor and associated parts.

Figure 6 is a sectional detail on the line 6—6 of Figure 4.

Corresponding and like parts are referred to in the following description and designated in the several views of the drawings by like reference characters.

Figure 7:
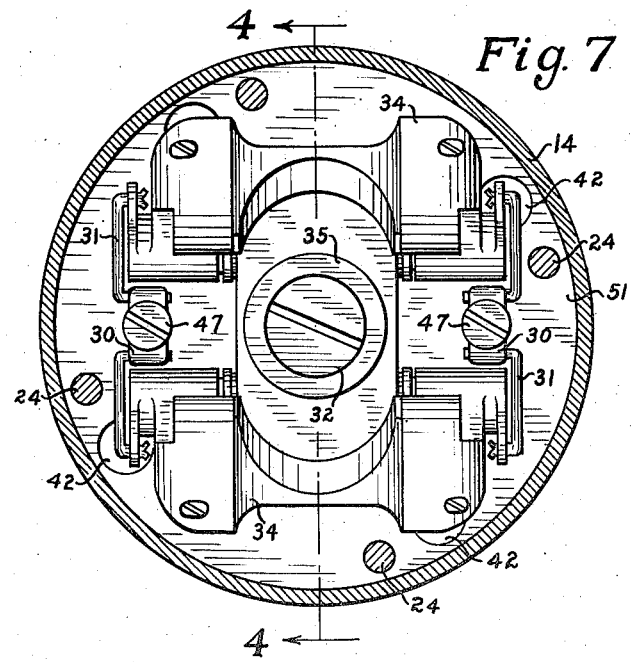
Figure 7 is a cross section on the line 7—7 of Figure 1.
Figure 8:
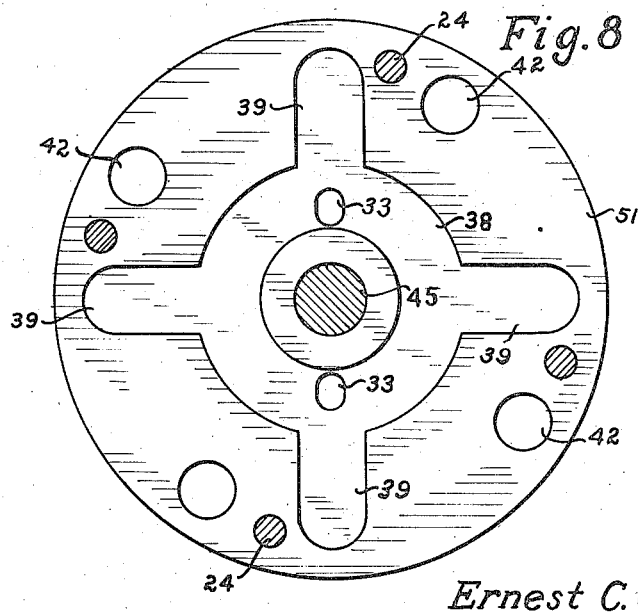
Figure 8 is a cross section on the line 8—8 of Figure 4.
Figure 9:
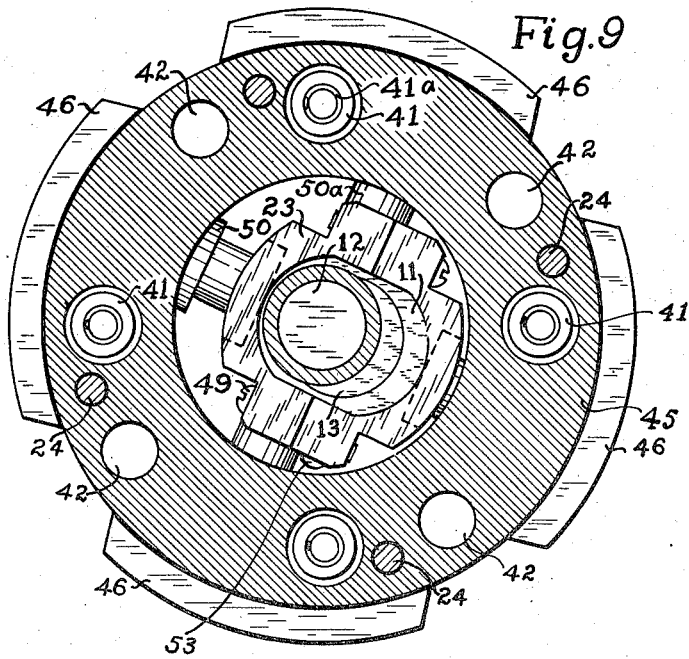
Figure 9 is a cross section on the line 9—9 of Figure 4.
Figure 10:
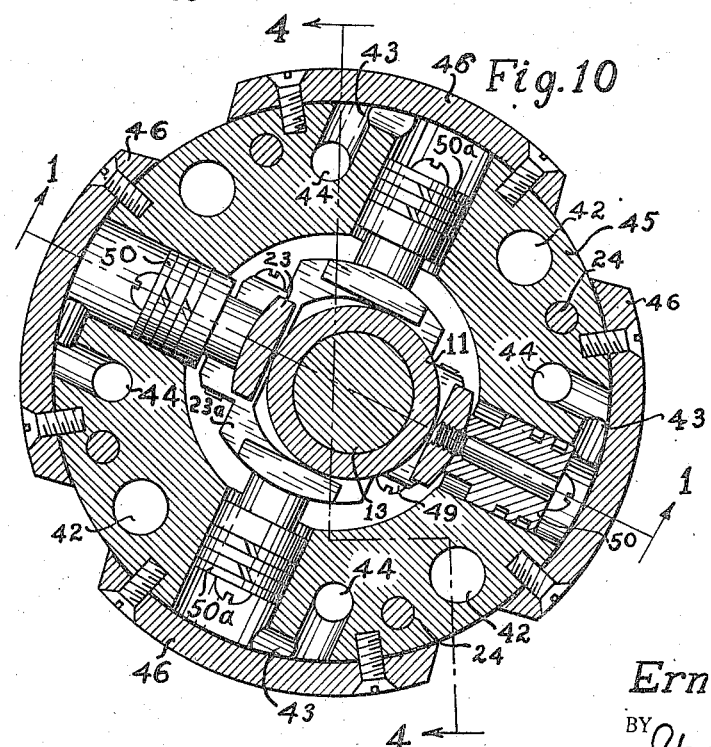
Figure 10 is a cross section on the line 10—10 of Figure 1.

The numeral 12 designates a drive member which consists of the drive shaft from the motor of an automobile. The numeral 12a represents the driven member and indicates the shaft from the differential of an automobile. The unit is mounted upon these members and constitutes the ratio connecting means between them to automatically compensate for speed and power. The body of the unit is rigid with the driven part 12a and loose with reference to the drive part 12. A clutch element 17 is splined on the drive member 12 and coacts with a companion clutch element 18 connected with the body to admit of the drive and driven members 12 and 12a being clutchingly engaged and disengaged as required. The element 17 may be operated from any remote point by means of a yoke 16 and connection 16a.

The body includes a rotary pump, supply and exhaust chambers for the controlling fluid, valves for regulating the flow of the fluid to and from the pump and a governor for regulating the outflow from the pump and controlled by the speed of the driven member to automatically change the ratio, depending upon the load and power.

The pump comprises a block 45 in which radial openings are formed to provide cylinders which are closed at their outer ends by plates or heads 46. Four cylinders are shown, connected pistons 50 and 50a operating in opposed cylinders. Split yokes 23 and 23a connect the pistons of each pair and these yokes are disposed upon opposite sides of an eccentric 13 preferably formed with the drive member 12. Bolts 49 connect the parts of each yoke. Lateral extensions on the yokes form abutments at the inner ends of the pistons to sustain the thrust of the eccentric 13. An anti-friction bearing ring 11 is mounted on the eccentric 13 and is located between it and the abutments of the yokes. The central portion of the block 45 is recessed to receive the eccentric and piston connecting yokes.

Plates 22 and 51 are located upon opposite sides of the cylinder block 45. Intake valves 40 are mounted in the plate 22, there being one for each of the cylinders. The valves 40 close outwardly and are normally held seated by springs 40a. Other valves 41 are mounted in the cylinder block 45 and close inwardly and are held seated by springs 41a. These valves 40 and 41 are of like formation and have tubular stems in which are formed lateral outlets. A passage 43—44 is associated with each of the cylinders and formed in the block 45. The plate 51 is formed upon the side adjacent the block 45 with an annular channel 38 and radial channels 39, the latter connecting at their outer ends with the passages 44 to receive the outflow therefrom. A hollow projection is provided upon the outer side of the plate 51 and contains a chamber 35 and passages 33, the latter connecting with the channel 38 and chamber 35. Openings 26 in the sides of the projection afford outlets from the chamber 35. A valve 25 in the chamber 35 controls communication between the passages 33 and the outlets 26 and is normally held seated by spring 27. A stop 32 threaded in the chamber 35 regulates the tension of the spring 27. Rotary valves 28 mounted in the hollow projection control the passages 33 and have cut away portions 29 to register with the said passages and control the outflow therefrom. Weighted yokes 34 are secured to the projecting ends of the valves 28 and determine their position. These yokes 34 and the parts associated therewith and now to be disclosed, constitute the governor mechanism to regulate the outflow from the pump. Links 31 connect the yokes 34 with slides 30 mounted on guides 47 attached to the plate 51. A spring 36 is mounted on each of the guides 47 and urges the slide 30 outwardly and the weighted ends of the yokes 34 inwardly, as indicated most clearly in Figure 5 of the drawings. A stop 48 threaded on each of the guides 47 regulates the tension of the spring 36.

Housings 14 and 14a are disposed exterior to the plates 51 and 22 and are secured thereto and to the cylinder block 45 by bolts 24. These housings enclose spaces which form chambers 14b and 14c for storage of the fluid essential to the operation of the device. Registering openings 42 formed in the cylinder block 45 and valve plates 22 and 51 connect the supply and exhaust chambers 14b and 14c. Moreover, the governor mechanism is housed in the chamber 14c. The plate 22 is formed with a hub or boss which extends across the chamber 14b and enters a recess formed in the housing 14a, a packing 21 being confined between the said hub and recess to prevent any loss of fluid from the chamber 14b around the drive member 12.

From the foregoing, taken in connection with the accompanying drawings, it will be understood that rotation of the drive shaft 12 actuates the pistons through the eccentric 13. On the instroke, fluid is drawn into the cylinder from the supply chamber 14b past the intake valve 40. On the outstroke of each piston, valve 40 is closed and exhaust valve 41 is opened, permitting the fluid to pass from the cylinder into the passage 39 and channel 38 which forms a discharge chamber. The fluid passes from the chamber 38 through the governor valve controlled passages 33 into the relief chamber 35 and is held in check by the valve 25. As the pressure increases in the chamber 35, resistance to the movement of the pistons proportionately increases until the valve 25 yields and permits a portion of the fluid to pass through the outlets 26 into the chamber 14c and through passages 42 back to the chamber 14b to be re-used in the cycle of operation. Thus, the pump draws in an amount of fluid at each instroke of a piston, and discharges the fluid through the restricted valve controlled openings 26 and 29, hence, the rotation of the drive shaft 12 is proportionately faster than the driven shaft 12a. The yielding of the relief valve 25 allows a varied amount of the discharge to escape, with the result that the motive power is gradually applied without any appreciable jerk or jolt. In the case of an automobile, the same may be started smoothly by engaging the standard friction clutch even though the drive shaft 12 starts with a jerk. After the auxiliary fluid clutch has started the governor begins to function, gradually operating the cut-off valves 28 to close the passages 33 until at the predetermined speed of the driven shaft 12a, the passages 33 are completely closed, preventing any discharge from the pump. At this stage of the operation, the pistons are prevented from moving in their respective cylinders and the clutch functions to cause the drive and driven shafts to rotate in unison. Hence, there is a yielding or cushioned start, with a gradual automatic change of ratio up to the speed of the drive shaft. When the load increases, as when negotiating a grade, or the speed lowers below that at which the governor completely closes the cut-off valves 28, the latter automatically open more or less to afford the needed ratio.

Having thus described the invention, what I claim is:

1. A clutch of the character specified, comprising a fluid pump embodying cylinders and pistons therein, communicating supply and exhaust chambers at the sides of the pump, valved passages intermediate the respective pump cylinders and supply and exhaust chambers, a relief chamber communicating with the said exhaust chamber and having passages for the flow of the exhaust from the pump, governor controlled valves for regulating the outflow of the exhaust through the last mentioned passages, and a yielding valve for regulating the discharge from the relief chamber.

2. A clutch of the character specified, comprising a fluid pump embodying cylinders and pistons therein, an eccentric within the pump for actuating the pistons in sequence, a chamber for receiving the fluid medium, intake and exhaust valves for controlling the fluid supply and discharge, a relief chamber in communication with the fluid receiving chamber, governor controlled valves for regulating the discharge from the pump to the relief chamber, and a yielding valve for regulating the discharge from the relief chamber.

3. A clutch of the character specified, comprising a fluid pump embodying a cylinder block, plates at the sides of the cylinder block, intake and exhaust valves for controlling the flow through the pump cylinders and through said plates, governor controlled valves mounted on the plate applied to the exhaust side of the cylinder block for regulating the discharge therethrough, a relief chamber for receiving the governor controlled discharge, and a yielding valve for controlling the outflow from the relief chamber.

4. A clutch of the character specified, comprising a fluid pump embodying a cylinder block, plates at the sides of the cylinder block, intake and exhaust valves for controlling the flow through the pump cylinders and through said plates, rotary valves mounted on the plate applied to the exhaust side of the cylinder block, weighted yokes fast to the ends of said rotary valves, a relief chamber for receiving the governor controlled discharge, and a yielding valve for controlling the outflow from the relief chamber.

5. A clutch of the character specified, comprising a fluid pump embodying a cylinder block formed with passages for the inflow and outflow of the fluid, intake and exhaust plates at the sides of the cylinder block, the exhaust plate having a compression chamber and passages connecting with the said passages of the cylinder block, intake valves on the intake plate, exhaust valves on the cylinder block, governor controlled cut off valves on the exhaust plate, a relief chamber, a yielding valve in the relief chamber, and supply and exhaust chambers exterior to the said intake and exhaust plates and in communication with each valve, the exhaust chamber housing the relief valve and the governor mechanism.

6. A clutch of the character specified, comprising a fluid pump embodying a cylinder block, pistons in the cylinders, an eccentric in the block, yokes at the sides of the eccentric connecting opposed pistons, intake and exhaust plates at the sides of the cylinder block, supply and exhaust chambers exterior to the plates and in communication through openings formed in the said block and plates, intake and exhaust valves controlling the inflow and the outflow of the pump, a relief chamber in the exhaust chamber and connected with the pump cylinders, cut off valves in the passages leading to the relief chamber from the pump, and a governor mechanism housed in the exhaust chamber and connected with the cut off valves for automatic actuation thereof.

7. In combination with a drive and a driven member, a clutch body fast to the driven member and loose on the drive member, a clutch for connecting said clutch body and drive member, the clutch body embodying a cylinder block having fluid passages, intake and exhaust plates at the sides of the block, and supply and exhaust chambers exterior to the said plates and in communication through openings formed in the cylinder block and plates, an eccentric fast to the drive member and disposed within the cylinder block, pistons in the cylinders of the block, split yokes at the sides of the eccentric and connecting opposed pistons in pairs, intake and exhaust valves associated with the passages of the cylinder block, a relief chamber carried by the exhaust plate and connected by exhaust passages with the outlets of the cylinders, rotary cut off valves controlling the flow through said exhaust passages, weighted yokes connected with the cut off valves, and a spring actuated valve for controlling the outflow from the relief chamber.

ERNEST C. GAMBRELL.